(12) United States Patent
Hundemer

(10) Patent No.: US 9,516,096 B1
(45) Date of Patent: Dec. 6, 2016

(54) SYSTEM AND METHOD FOR TRANSMITTING DATA TO A DEVICE BASED ON AN ENTRY OF A RUNDOWN FOR A NEWS PROGRAM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 363 days.

(21) Appl. No.: 14/047,795

(22) Filed: Oct. 7, 2013

Related U.S. Application Data

(60) Provisional application No. 61/885,944, filed on Oct. 2, 2013.

(51) Int. Cl.
*H04L 29/08* (2006.01)
*H04L 29/06* (2006.01)
*H04N 1/21* (2006.01)
*H04N 1/32* (2006.01)
*H04N 1/00* (2006.01)

(52) U.S. Cl.
CPC .............. *H04L 67/10* (2013.01); *H04L 65/60* (2013.01); *H04L 65/601* (2013.01); *H04L 65/605* (2013.01); *H04L 67/1095* (2013.01); *H04L 67/28* (2013.01); *H04L 67/2819* (2013.01); *H04L 67/2842* (2013.01); *H04N 1/00954* (2013.01); *H04N 1/2129* (2013.01); *H04N 1/2133* (2013.01); *H04N 1/32486* (2013.01)

(58) Field of Classification Search
None
See application file for complete search history.

(56) References Cited

U.S. PATENT DOCUMENTS

| | | | |
|---|---|---|---|
| 6,321,336 B1 * | 11/2001 | Applegate | H04L 63/02 709/220 |
| 6,909,874 B2 | 6/2005 | Holtz et al. | |
| 8,799,005 B2 * | 8/2014 | Pantaliano | G06Q 30/02 705/1.1 |
| 2002/0083468 A1 | 6/2002 | Dudkiewicz | |
| 2002/0108115 A1 | 8/2002 | Palmer | |
| 2004/0225719 A1 * | 11/2004 | Kisley | G06F 3/061 709/212 |
| 2007/0220008 A1 * | 9/2007 | Mizhar | H04L 67/06 |
| 2008/0072307 A1 * | 3/2008 | Maes | H04L 63/029 726/12 |
| 2009/0089294 A1 * | 4/2009 | Davis | H04N 7/17318 |
| 2011/0023059 A1 | 1/2011 | McCallister et al. | |
| 2011/0038597 A1 | 2/2011 | McCallister et al. | |
| 2011/0063317 A1 * | 3/2011 | Gharaat | G06Q 30/0244 345/545 |

OTHER PUBLICATIONS

Fecheyr-Lippens, Andrew. "A review of HTTP live streaming." Internet Citation (2010): 1-37.*

(Continued)

*Primary Examiner* — Scott B Christensen
*Assistant Examiner* — Lam Do
(74) *Attorney, Agent, or Firm* — McDonnell Boehnen Hulbert & Berghoff LLP

(57) ABSTRACT

Disclosed is a system and method for transmitting data to a device based on an entry of a rundown for a news program. An example method involves: (i) a first device recording data transmitted from a second device to a third device; (ii) assigning an identifier to the recorded data; (iii) selecting an entry from a rundown including entries indicative of a sequence of events related to a news program; (iv) making a determination that the selected entry is associated with the assigned identifier; and (v) responsive to making the determination, causing the recorded data to be transmitted to the third device.

20 Claims, 7 Drawing Sheets

(56) References Cited

OTHER PUBLICATIONS

Platform, P. C. "Windows Movie Maker ver. 6.0." The Electronic Journal for English as a Second Language 13.4 (2010).*
Babaguchi, Noboru, Yoshihiko Kawai, and Tadahiro Kitahashi. "Event based indexing of broadcasted sports video by intermodal collaboration." Multimedia, IEEE Transactions on 4.1 (2002): 68-75.*
Ault, Aaron, et al. "eStadium: the mobile wireless football experience." Internet and Web Applications and Services, 2008. ICIW'08. Third International Conference on. IEEE, 2008.*
Ge, Zihui, et al. "Modeling peer-peer file sharing systems." INFOCOM 2003. Twenty-Second Annual Joint Conference of the IEEE Computer and Communications. IEEE Societies. vol. 3. IEEE, 2003.*
Hundemer, Hank J., U.S. Appl. No. 14/743,667, filed Jun. 18, 2015.
Hundemer, Hank J., U.S. Appl. No. 14/047,805 Notice of Allowance mailed Apr. 15, 2015.
Disclosures referenced in the accompanying Declaration by Hank J. Hundemer.
Hundemer, Hank J., U.S. Appl. No. 14/047,805, filed Oct. 7, 2013, 54 pages.

* cited by examiner

SYSTEM AND METHOD FOR TRANSMITTING DATA TO A DEVICE BASED ON AN ENTRY OF A RUNDOWN FOR A NEWS PROGRAM

CROSS REFERENCES TO RELATED DISCLOSURES

The present disclosure claims priority to U.S. Provisional Patent Application No. 61/885,944, entitled "SYSTEM AND METHOD FOR TRANSMITTING DATA TO A DEVICE BASED ON AN ENTRY OF A RUNDOWN FOR A NEWS PROGRAM," which was filed on Oct. 2, 2013, and which is hereby incorporated by reference herein.

The present disclosure also relates to U.S. patent application Ser. No. 14/047,805, entitled "SYSTEM AND METHOD FOR TRANSMITTING A PACKET STREAM TO A DEVICE", which is assigned to the assignee of the present disclosure, which is being filed simultaneously with the present disclosure, and which is hereby incorporated by reference herein.

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

TECHNICAL FIELD

This disclosed system and method relate generally to news production systems.

BACKGROUND

Unless otherwise indicated herein, the materials described in this section are not prior art to the claims in this disclosure and are not admitted to be prior art by inclusion in this section.

A news production system (NPS) may facilitate the production of a news program in the form of a media stream. In one example, an NPS may include multiple media sources and a production switcher, where outputs of the media sources are connected to inputs of the production switcher. This may allow the production switcher to switch between and/or combine multiple media streams output by the media sources, thereby outputting the news program in the form of another media stream.

There are various types of media, including for example, audio, video, or a combination thereof. As such, in one example, an NPS may output a news program in the form of an audio stream. In this instance, the NPS may transmit the audio stream to a radio-broadcasting system for broadcast. As another example, a media stream may take the form of a video stream or a combined audio and video stream. In such instances, the NPS may transmit the video stream or the combined audio and video stream to a television-broadcasting system for broadcast.

A media source may take a variety of forms. For example, a media source may take the form of a media server. A media server is a device configured for retrieving a media file, converting the retrieved media file into a media stream, and outputting the converted media stream.

As another example, a media source may take the form of a media effect engine. A media effect engine is a device configured for retrieving a media effect (sometimes referred to as a "page"), and running the media effect thereby outputting a corresponding media stream. A media effect may be stored as a file that includes instructions and other data (e.g., media) related to the media effect. By running the media effect, the media effect engine may generate and output a media stream based on those instructions. Media effects are commonly used as a means to generate animations, graphics, or other visual effects in the form of a media stream that can be overlaid on another media stream. For instance, in the context of a news program, a "lower third" media effect may be used to overlay a graphic over a lower third portion of a media stream.

As such, in one example NPS, a media server may output a first media stream while a media effect engine outputs a second media stream, and a production switcher may combine the two media streams (e.g., by overlaying the second media stream over the first media stream) to output the news program in the form of a third media stream. The production switcher may then transmit the third media stream to a broadcasting system (e.g., a television-broadcasting system) for broadcast.

A media effect engine may be controlled in a variety of ways such that it may perform the steps of retrieving a media effect and running the media effect. For instance, a user may control a media effect engine by providing it a suitable instruction via a user-interface. However, for a variety of reasons, this manner of controlling the media effect engine may be undesirable. Among other things, this process may be time-consuming for the user. In addition, it may be difficult for the user to ensure that the media effect engine performs such steps at appropriate times during production of the news program.

As another example, a controller device may control a media effect engine by providing it a suitable instruction in accordance with one or more application programming interfaces (API) that may be made publically available by the provider of the media effect engine or another entity. However, again for a variety of reasons, this manner of controlling the media effect engine may be undesirable. Among other things, it may be time-consuming for a user to configure the controller device to provide such a suitable instruction.

This approach may be particularly time-consuming given that different instructions may need to adhere to different APIs. For instance, an instruction requesting the running of one type of media effect may need to adhere to a different API than another instruction requesting the running of another type of media effect. In addition, it may be difficult for the user to configure the controller device such that it causes the media effect engine to retrieve and run a particular media effect at an appropriate time during production of the news program.

SUMMARY

In one aspect, an example method involves: (i) a first device recording data transmitted from a second device to a third device; (ii) assigning an identifier to the recorded data; (iii) selecting an entry from a rundown including entries indicative of a sequence of events related to a news program; (iv) making a determination that the selected entry is associated with the assigned identifier; and (v) responsive to making the determination, causing the recorded data to be transmitted to the third device.

In another aspect, an example method involves: (i) selecting an entry from a rundown including entries indicative of a sequence of events related to a news program; (ii) making a determination that the selected entry is associated with an identifier assigned to a recording of data transmitted from a first device to a second device; and (iii) responsive to making the determination, causing a third device to send the recorded data to the second device.

In another aspect, a method involves: (i) a first device recording data transmitted from a second device to a third device; (ii) using the recorded data to generate data that is a modified version of the recorded data; (iii) assigning an identifier to the generated data; (iv) selecting an entry from a rundown comprising entries indicative of a sequence of events related to a news program; (v) making a determination that the selected entry is associated with the assigned identifier; and (vi) responsive to making the determination, causing the generated data to be transmitted to the third device.

In another aspect, an example method involves: (i) selecting an entry from a rundown including entries indicative of a sequence of events related to a news program; (ii) making a determination that the selected entry is associated with an identifier assigned to data generated based on a recording of data transmitted from a first device to a second device; and (iii) responsive to making the determination, causing a third device to send the generated data to the second device.

These, as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

Figure 1:
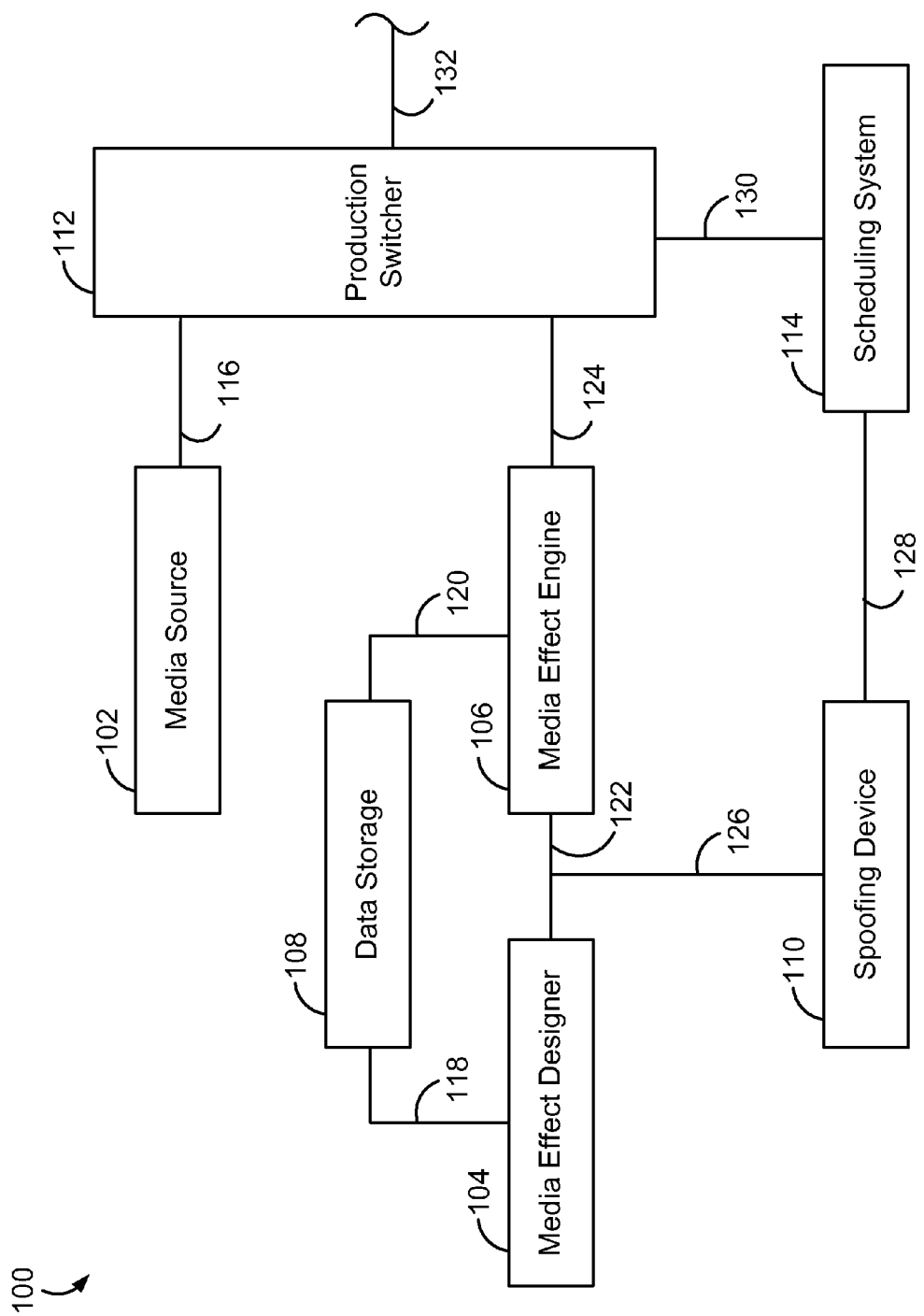
FIG. 1 is a simplified diagram of an example NPS.

As noted above, a media effect engine may be configured for retrieving a media effect and running the media effect, thereby outputting a media stream. However, before the media effect engine may retrieve a media effect, the media effect must first be designed and stored. A media effect designer may be used for this purpose.

A media effect designer is a device configured for designing and storing a media effect. Like a media effect engine, a media effect designer may be controlled in a variety of ways. For instance, a user may control a media effect designer by providing it a suitable instruction via a user-interface. As such, in an instance where a media effect takes the form of a file including instructions and other data, the media effect designer may create or edit that file based on instructions received from a user.

In some instances, a media effect designer may cause the media effect designer to retrieve and run a media effect on a preview channel of the media effect engine. This may involve the media effect designer transmitting to the media effect engine a suitable instruction that causes the media effect engine to retrieve and run the media effect on the preview channel. Typically, such an instruction does not adhere to the APIs discussed above. But instead, the instruction typically adheres to a particular protocol that is understood by both the media effect designer and the media effect engine, but that is not made publically available by the provider of the media effect engine or another entity.

In an example of the disclosed system and method, the instruction transmitted from the media effect designer to the media effect engine may be leveraged to allow a "spoofing" device to control the media effect engine at a later time. This may involve the spoofing device recording data transmitted from the media effect designer to the media effect engine, assigning an identifier to the recorded data, later recalling the recorded data based on an indication of the assigned identifier, and transmitting the recorded data to the media effect engine. With this technique, a device other than the media effect designer may cause the media effect engine to retrieve and run the media effect, all without the device transmitting to the media effect engine an instruction that adheres to one of the APIs as discussed above.

In addition, a scheduling system may be configured to cause the spoofing device to perform such functions based on an entry in a rundown. Generally, a rundown is a schedule of events (and related information) that make up a news program. Based on a rundown entry being associated with the assigned identifier, the scheduling system may cause the media effect engine to retrieve and run the media effect. This may involve the scheduling system selecting an entry from the rundown, the scheduling system making a determination that the selected entry corresponds to the assigned identifier, and responsive to the scheduling system making the determination, the scheduling system causing the spoofing device to transmit the recorded data to the media effect engine.

The scheduling system may also be configured to select and process rundown entries in order. As such, a user may control the timing as to when the media effect engine retrieves and runs a particular media effect by ensuring that the corresponding assigned identifier is associated with a particular rundown entry.

II. Example NPS

FIG. 1 is a simplified block diagram of an example NPS 100. The NPS 100 may be configured to perform a variety of steps related to producing a news program. The NPS may output the news program in the form of a media stream, which in turn may be transmitted to a broadcasting system for broadcast. A media stream may be transmitted according to a variety of different standards. For instance, a media stream may be transmitted according to the high-definition serial digital interface (HD-SDI) (with a data transfer rate of 1.485 Gbps).

The NPS 100 may include one or more devices, including for example a media source 102, a media effect designer 104, a media effect engine 106, a data storage 108, a spoofing device 110, a production switcher 112, and a scheduling system 114.

These devices may be connected with each other and/or with external devices via one or more communication paths. For example, the media source 102 and the production switcher 110 may be connected via a path 116, the media effect designer 104 and the data storage 108 may be connected via a path 118, and the media effect engine 106 and the data storage 108 may be connected via a path 120.

In addition, the media effect designer 104 and the media effect engine 106 may be connected via a path 122, the media effect engine 106 and the production switcher 112 may be connected via the path 124, and the spoofing device 110 and the path 122 may be connected via a path 126. Still further, the spoofing device 110 and the scheduling system 114 may be connected via a path 128, the scheduling system 114 and the production system 112 may be connected via a path 130, and the production system 110 and an external device (e.g., a router of a broadcasting system) may be connected via a path 132.

Though these communication paths, a device may transmit various types of data to one or more other devices. For example, one device may transmit instructions to a second device to control the second device. As another example, one device may transit a media stream to another device. Notably, such devices may exchange data according to one or more standards or protocols. For example, one device may send data to another device in the form of a packet stream.

Generally, the media source 102 is a device configured for outputting a media stream, and may take a variety of forms. For example, the media source 102 may take the form of a media server, which is a device configured for retrieving a media file, converting the retrieved media file into a media stream, and outputting the converted media stream. An example of a media server is the K2 server provided by Grass Valley™ of San Francisco, Calif. As additional examples, the media source 102 may take the form of a satellite receiver or a video camera. As the media source 102 outputs a media stream, the media source 102 may transmit the media stream to the production switcher 112 via the path 116.

Generally, the media effect designer 104 is a device configured for designing and storing a media effect. The media effect designer 104 may design a media effect based on input received from a user via a user-interface. Then, the media effect designer 104 may store the media effect in the data storage 108 such as in the form of a file. An example of a media effect designer is the Viz Artist provided by Vizrt™ of Bergen, Norway.

Generally, the media effect engine 106 is a type of media source, and is a device configured for retrieving a media effect and running the retrieved media effect, thereby outputting a corresponding media stream. The media effect engine 106 may retrieve a media effect from the data storage 108. And as the media effect engine 106 outputs a media stream, the media effect engine 106 may transmit the media stream to the production switcher 112 via the path 124. An example of a media effect engine is the Viz Video Engine provided by Vizrt™ of Bergen, Norway.

As noted above, the media effect designer 104 may be configured for transmitting to the media effect engine 106, instructions that cause the media effect engine 106 to retrieve and run a media effect on a preview channel of the media effect engine 106. This allows a user to preview the media effect as the user is designing it.

Generally, the spoofing device 110 is configured for recording data and transmitting the recorded data (or a modified version thereof) to another device. For instance, the spoofing device 110 may be configured for recording data transmitted from the media effect designer 104 to the media effect engine 106 such as via path 122 (the spoofing device 110 may access this data via the path 126). In one example, the path 122 may be a path of a packet-based network, and the path 126 may provide the spoofing device 110 with access to that network such that the spoofing device may monitor packet transmission over the network. Further, the spoofing device 110 may be configured for transmitting the recorded data (or a modified version thereof) to the media effect engine 106 such as via the paths 126 and 122. In one example, the spoofing device 110 may provide such functionality by running a network protocol analyzer and/or a packet generator application such as Sniffer Portable Professional Analyzer provided by NetScout™ of Westford, Mass.

Generally, the production switcher 112 is a device configured for performing functions related to input-to-output mapping. For instance, the production switcher 110 may be configured for switching between and/or combining multiple media streams output by the media sources 102 and 106 and transmitted to the production switcher 112 (via paths 116 and 124, respectively), so the production switcher 112 may output a news program in the form of a media stream. The production switcher 112 may transmit this media stream to an external device such as a router of a broadcasting system via the path 132. Note that this media stream may be subjected to additional processing before being broadcast. For example, the media stream may be modified with a digital video effect (DVE) before being broadcast. An example of a production switcher is the Vision switcher provided by Ross Video™ of Iroquois, Ontario in Canada.

Generally, the scheduling system 114 is a device configured for performing functions related to scheduling and managing the production of a news program, and for controlling one or more other devices in the NPS 100. For example, the scheduling system may be configured for creating or editing a rundown based on input from a user via a user-interface. Further, the scheduling system 112 may be configured for traversing and processing entries in a rundown. Yet further, the scheduling system 114 may be configured for controlling the spoofing device 110 (via path 128) and the production switcher 112 (via path 130).

Figure 2:
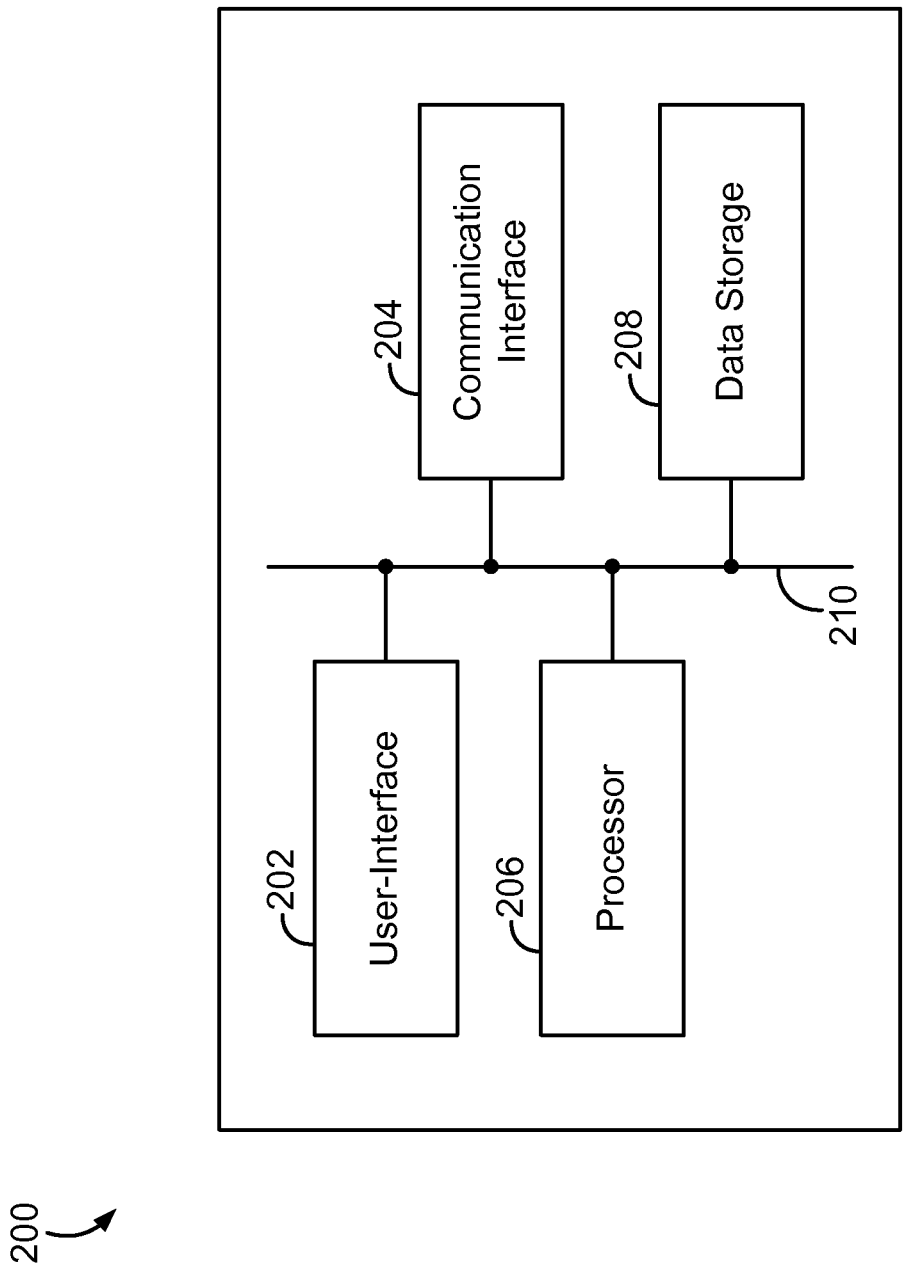
FIG. 2 is a simplified diagram of an example device.

FIG. 2 is a simplified block diagram of a device 200. The device 200 may take a variety of forms, including, for example, the media source 102, the media effect designer 104, the media effect engine 106, the data storage 108, the spoofing device 110, the production switcher 112, or the scheduling system 114.

The device 200 may include various components, including, for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker.

The communication interface 204 may function to allow the device 200 to communicate with one or more other devices (e.g., over one or more paths as described above). The communication interface 204 may be configured to transmit and/or receive various types of data, including for example control data or media stream data. In one example, the communication interface 204 may take the form of a wired interface, such as an Ethernet port, USB port, or HD-SDI port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the steps described herein and/or shown in the accompanying drawings. As such, the data storage 208 may take the form of a non-transitory computer-readable storage medium, having stored thereon program instructions that, upon execution by the processor 206, cause the device 200 to perform one or more of the steps described herein and/or shown in the accompanying drawings.

III. Example Operations

Figure 3:
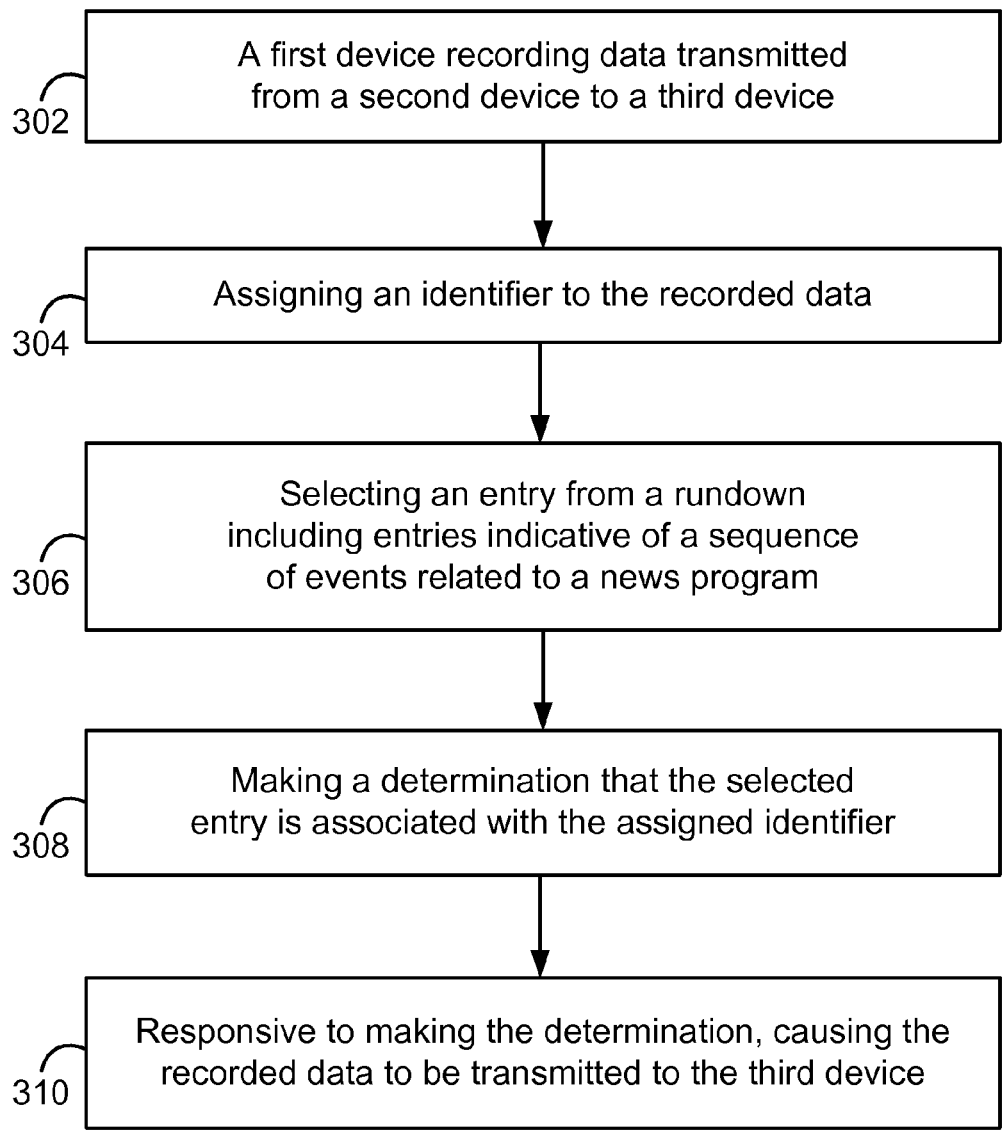
FIG. 3 is a flowchart showing steps of a first example of the disclosed method.

FIG. 3 is a flowchart showing steps of a first example of the disclosed method. At block 302, the method may involve a first device recording data transmitted from a second device to a third device. For instance, the method may involve the spoofing device 110 recording data transmitted from the media effect designer 104 to the media effect engine 106 (via path 122). In one example, the packet stream may include instructions that cause the media effect designer 104 to retrieve and run a media effect on a preview channel of the media effect engine 106.

Note that throughout this disclosure, numerical modifiers (e.g., first or second) are used to establish unique terms for ease of reference as opposed to indicating a particular characteristic (e.g., position or order) of the modified term.

The data being recorded may take various forms. For example, the data may take the form of a packet stream. Also, the data may represent various types of information. For example, the data may represent an instruction related to a media effect that the media effect designer is previewing. For instance, the data may represent an instruction that causes the media effect engine to retrieve and run the media effect thereby outputting a corresponding media stream. Notably, in some instances, the data may represent additional instructions, such as instructions that cause the media effect engine 106 to load or mount the media effect. Such instructions may differ depending on the configuration of the media effect designer 104 and/or the media effect engine 106.

At block 304, the method may involve assigning an identifier to the recorded data. For instance, the method may involve the spoofing device 110 assigning an effect identifier to the recorded data. Notably, the steps at blocks 302 and 304 may be repeated for multiple different media effects being previewed by the media effect designer 104.

Figure 4:
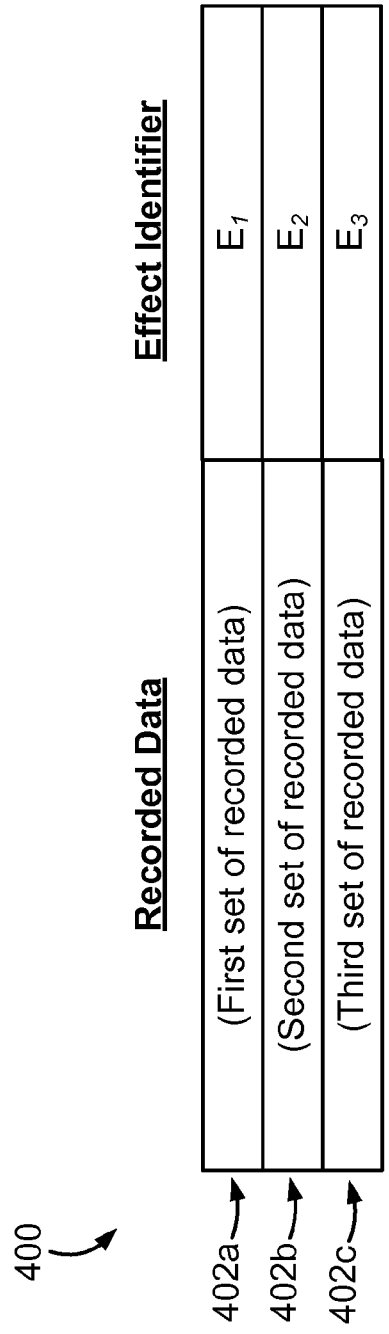
FIG. 4 is a simplified diagram of an example table in accordance with the disclosed system and method.

As shown in FIG. 4, in one example, each portion or set of recorded data and the corresponding assigned effect identifier may be stored as a separate record in a table 400. For example, the table 400 may include a first record 402a having a first set of recorded data and a corresponding identifier $E_1$ (i.e., indicating that the effect identifier $E_1$ was assigned to the first set of recorded data). Likewise, the table 400 may include a second record 402b having a second set of recorded data and a corresponding identifier $E_2$, and the table 400 may include a third record 402c having a third set of recorded data and a corresponding identifier $E_3$. Notably, such data may be stored in alternative manners as well.

Once an effect identifier is assigned to recorded data as shown in FIG. 4, the effect identifier may be associated with an entry in a rundown. For example, though an interface of the scheduling system 114, a user may edit a script (e.g., PHP script) of a rundown entry to refer to the assigned effect identifier.

Figure 5:
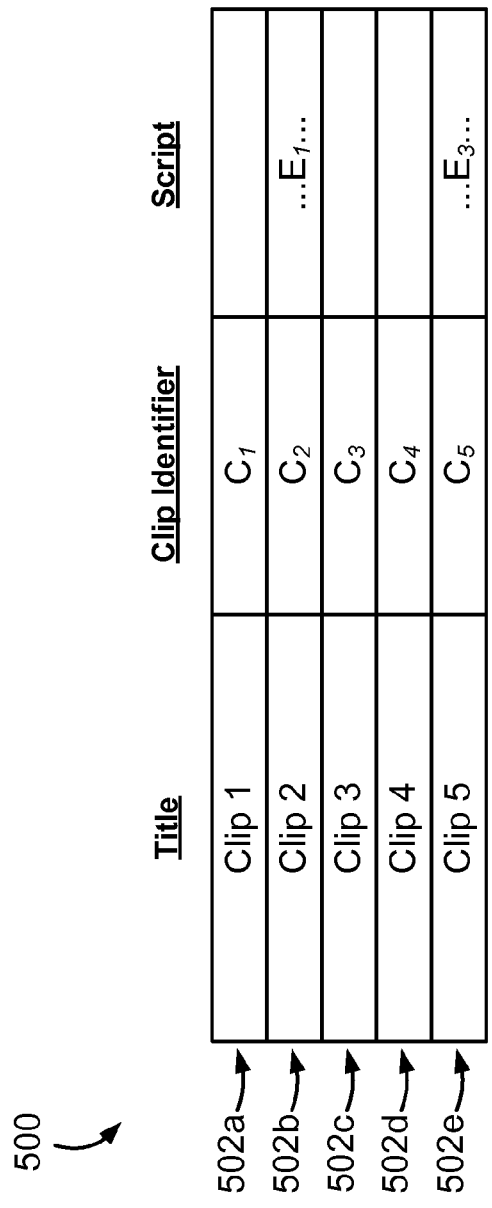
FIG. 5 is a simplified diagram of an example rundown in accordance with the disclosed system and method.

FIG. 5 shows an example rundown 500 for a news program. The rundown 500 includes ordered rundown entries, each represented as a separate row. Each rundown entry includes one or more attributes, such as a title, a clip identifier, and/or a script. For example, the rundown 500 includes a first rundown entry 502a having a title "Clip 1" and a clip identifier "$C_1$" (i.e., which corresponds to a particular media file). As another example, the rundown 500 includes a second rundown entry 502b having a title "Clip 2" and an effect identifier "$E_1$." referenced in the script.

Note that the attributes described above may be represented in a variety of different manners. It should also be noted that the rundown 500 has been greatly simplified for the purposes of providing examples of the disclosed system and method. In practice, a rundown is likely, although not required, to include significantly more data. For example, rundown entries may include additional attributes, including for example, an index or "page" number (not to be confused with the same term commonly used to refer to a media effect), an estimated duration, an actual duration, and/or an author. However, as noted above, for the sake of simplicity, the simplified rundown 500 is provided herein.

Returning to FIG. 3, at block 306, the method may involve selecting an entry from a rundown including entries indicative of a sequence of events related to a news program. For instance, the method may involve the scheduling system 114 selecting the entry 502b from the rundown 500. Recall that a scheduling system may be configured to select and process rundown entries in order. As such, the scheduling system 114 may select the entry 502b as part of the scheduling system's traversal of the entries in the rundown 500.

At block 308, the method may involve making a determination that the selected entry is associated with the assigned identifier. For instance, the method may involve the scheduling system 114 making a determination that the selected entry 502b is associated with the identifier $E_1$. The scheduling system 114 may make this determination by determining that a script of the selected rundown entry includes a reference to the assigned effect identifier.

At block 310, the method may involve responsive to making the determination, causing the recorded data to be transmitted to the third device. For instance, the method may involve responsive to the scheduling system 114 making the determination, the scheduling system 114 causing the spoofing device 110 to transmit the first set of recorded data in the table 400 to the media effect engine 106, thereby causing the media effect engine 106 to retrieve and run the corresponding media effect.

In one example, the step at block 310 may involve the scheduling system 114 executing a script of the selected rundown entry, thereby causing the spoofing device 110 to transmit the recorded data to the media effect engine 106. The scheduling system 114 may cause the spoofing device 110 to perform this step by sending the spoofing device 110 a suitable instruction (e.g., via the path 128).

As illustrated by the tables in FIGS. 4 and 5, a user may control the timing as to when the media effect engine 106 retrieves and runs a particular media effect by ensuring that the corresponding assigned effect identifier is associated with a particular rundown entry. Note that in response to selecting a particular rundown entry, the scheduling system 114 may cause one or more other steps to be performed at or about the same time the corresponding media effect is run. For instance, upon selecting each rundown entry, the scheduling system 114 may cause the media source 102 to output a respective clip in the form of a media stream, and may further set the input-to-output mappings of the production switcher 112 such that the production switcher 112 may combine a first media stream output by the media source 102 and a second media stream output by the media effect 106, to thereby output the news program in the form of a third media stream.

As described above, with this technique, a device (e.g., the spoofing device 110) other than the media effect designer 104 may cause the media effect engine 106 to retrieve and run a media effect, all without the device transmitting to the media effect engine 106 an instruction that adheres to one of the APIs as discussed above. Indeed, since the spoofing device 110 records data being sent to the media effect engine 106 and then later sends that same data (or a modified version thereof) to the media effect engine 110, there is no need to control the media effect engine using those APIs.

Figure 6:
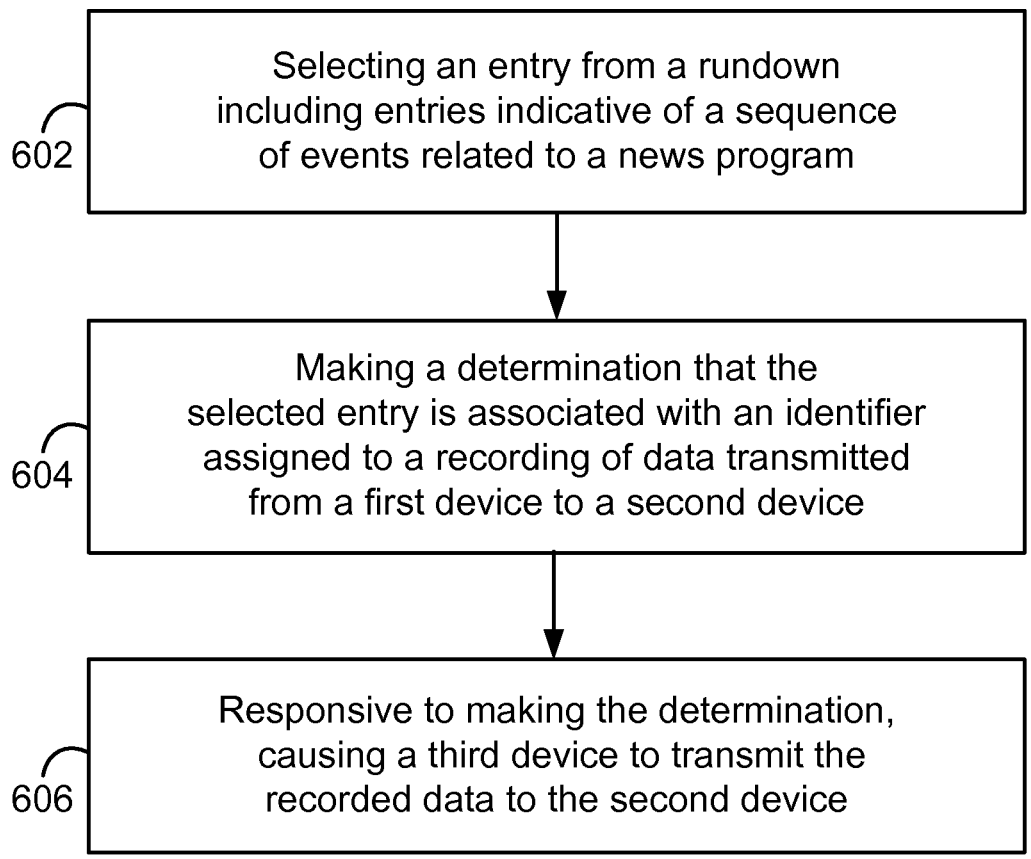
FIG. 6 is a flowchart showing steps of a second example of the disclosed method.

FIG. 6 is a flowchart showing steps of a second example of the disclosed method. At block 602, the method may involve selecting an entry from a rundown including entries indicative of a sequence of events related to a news program. For instance, the method may involve the scheduling system 114 selecting an entry from a rundown.

At block 604, the method may involve making a determination that the selected entry corresponds to an identifier assigned to a recording of data transmitted from a first device to a second device. For instance, the method may involve the scheduling system 114 making a determination that the selected entry corresponds to an identifier assigned to a recording of data transmitted from the media effect designer 104 to the media effect engine 106.

At block 606, the method may involve responsive to making the determination, causing a third device to transmit the recorded data to the second device. For instance, the method may involve, responsive to the scheduling system 114 making the determination, the scheduling system 114 causing the spoofing device 110 to transmit the recorded data to the media effect engine 106.

Also, it should be noted that in either of the example methods described above, the recorded data may be modified before being sent to the media effect engine 110. For instance, the recorded data may be modified to refer to a different media effect or to modify a parameter used in connection with the media effect. For example, this may involve modifying a text portion of the recorded data that is used in connection with the media effect. In one example, the method may involve using the recorded data to generate new data (i.e., data that is a modified version of the recorded data) such that the generated data may be sent to the media effect engine.

Figure 7:
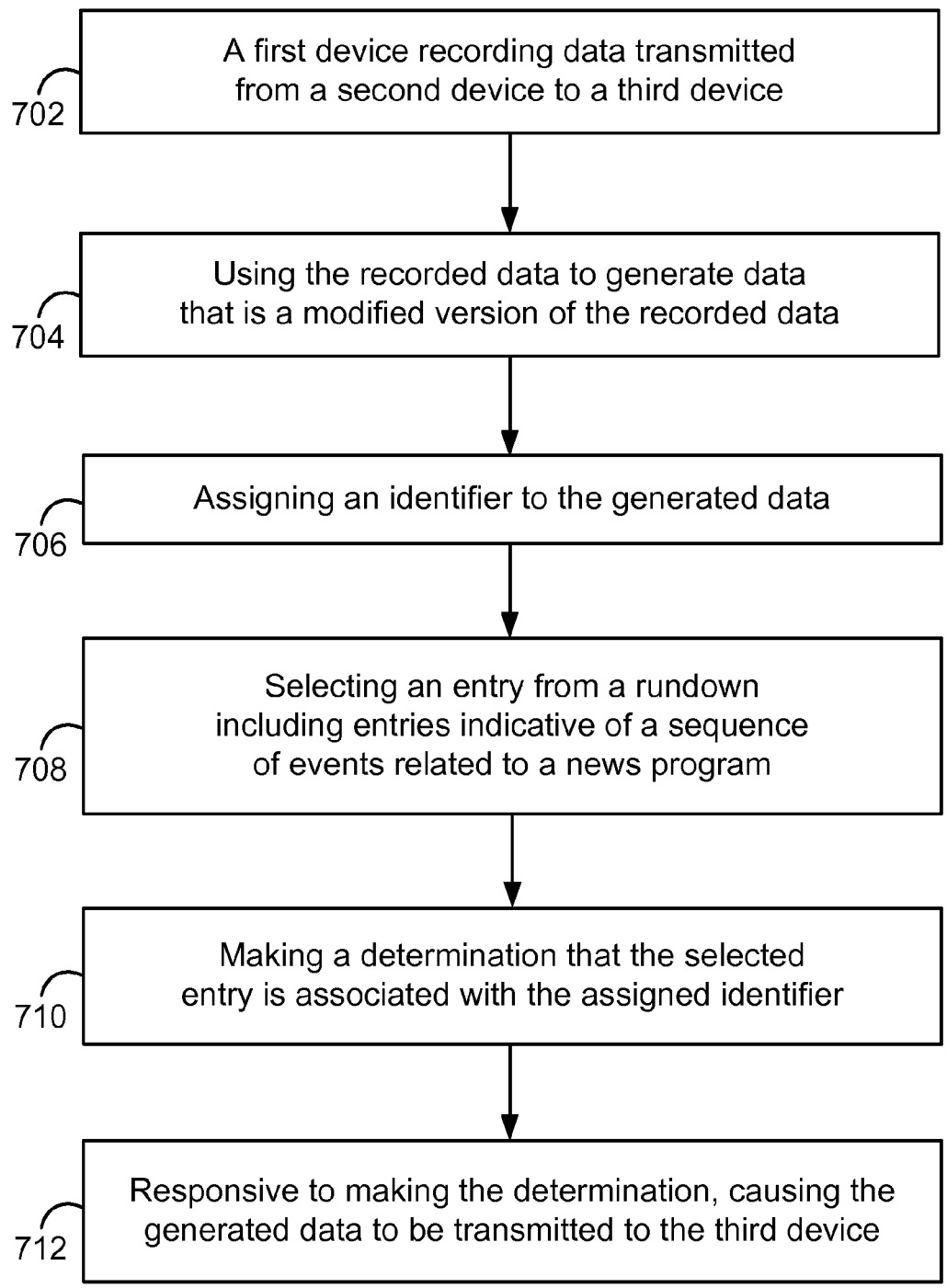
FIG. 7 is a flowchart showing steps of a third example of the disclosed method.

FIG. 7 is a flow chart showing steps of a third example of the disclosed method. At block 702, the method may involve a first device recording data transmitted from a second device to a third device. For instance, the method may involve the spoofing device 110 recording data transmitted from the media effect designer 104 to the media effect engine 106.

At block 704, the method may involve using the recorded data to generate data that is a modified version of the recorded data. For instance, the method may involve the spoofing device 110 using the recorded data to generate data that is a modified version of the recorded data (e.g., based on user input).

At block 706, the method may involve assigning an identifier to the generated data. For instance, the method may involve the spoofing device 110 assigning an effect identifier to the generated data.

At block 708, the method may involve selecting an entry from a rundown including entries indicative of a sequence of events related to a news program. For instance, the method may involve the scheduling system 114 selecting an entry from a rundown.

At block 710, the method may involve making a determination that the selected entry is associated with the assigned identifier. For instance, the method may involve the scheduling system 114 making a determination that the selected entry is associated with the assigned effect identifier.

At block 712, the method may involve, responsive to making the determination, causing the generated data to be transmitted to the third device. For instance, the method may involve, responsive to the scheduling system 114 making the determination, the scheduling system 114 causing the generated data to be transmitted to the media effect engine 106.

In some instances, since the generated data is a modified version of the recorded data, the media effect engine 106 may have issues with processing the generated data. The cross-referenced disclosure addresses this issue in greater detail, and further provides a technique for addressing this issue.

Figure 8:
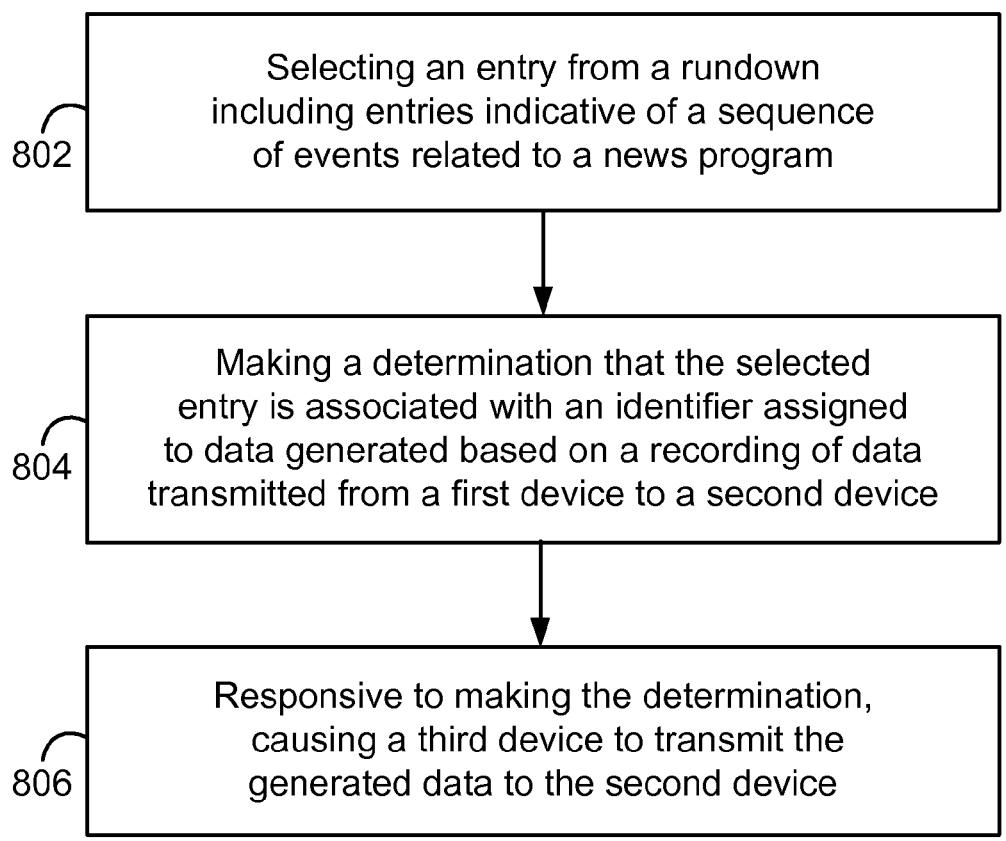
FIG. 8 is a flowchart showing steps of a fourth example of the disclosed method.

FIG. 8 is a flowchart showing steps of a fourth example of the disclosed method. At block 802, the method may involve selecting an entry from a rundown including entries indicative of a sequence of events related to a news program. For instance, the method may involve the scheduling system 114 selecting an entry from a rundown.

At block 804, the method may involve making a determination that the selected entry corresponds to an identifier assigned to data generated based on a recording of data transmitted from a first device to a second device. For instance, the method may involve the scheduling system 114 making a determination that the selected entry corresponds to an effect identifier assigned to data generated based on a recording of data transmitted from the media effect designer 104 to the media effect engine 106.

At block 806, the method may involve responsive to making the determination, causing a third device to transmit the generated data to the second device. For instance, the method may involve responsive to the scheduling system 114 making the determination, the scheduling system 114 causing the spoofing device 110 to transmit the generated data to the media effect engine 106.

IV. Example Variations

While one or more steps have been described as being performed by certain devices or entities (e.g., the spoofing device 110 or the scheduling system 114), the steps may be performed by any device or entity, such as those included in the NPS 100 described above. As just one example, the step at block 604 may involve the spoofing device 110 making a determination that the selected entry corresponds to an identifier assigned to a recording of data transmitted from a first device to a second device, and the step at block 606 may involve, responsive to the spoofing device 110 making the determination, the spoofing device 110 transmitting the recorded data to the media effect engine 106.

Also, the steps need not be performed in the disclosed order, although in some examples, an order may be preferred. And not all steps need to be performed to achieve the desired advantages of the disclosed system and method, and therefore not all steps are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A method for use with a first device, a second device, a third device, and a scheduling system, wherein the second device transmits data to the third device, the method comprising:
    after the second device transmits the data to the third device, the first device recording the data;
    assigning an identifier to the recorded data;
    the scheduling system selecting an entry from a rundown comprising entries indicative of a sequence of events related to a news program;
    the scheduling system making a determination that the selected entry is associated with the assigned identifier; and
    responsive to the scheduling system making the determination, the scheduling system causing the recorded data to be transmitted from a device other than the second device, to the third device.

2. The method of claim 1, wherein the second device is configured for designing one or more media effects and the third device is configured for running one or more media effects.

3. The method of claim 2, wherein the data comprises instructions for causing the third device to run a media effect, and wherein causing the recorded data to be transmitted, from the device other than the second device, to the third device thereby causes the third device to run the media effect.

4. The method of claim 3, wherein the data further comprises instructions for causing the third device to load the media effect.

5. The method of claim 2, wherein the data transmitted from the second device to the third device includes instructions that cause the third device to retrieve and run a media effect on a preview channel of the third device.

6. The method of claim 1, wherein causing the recorded data to be transmitted, from the device other than the second device, to the third device comprises causing the first device to transmit the recorded data to the third device.

7. The method of claim 6, wherein causing the first device to transmit the recorded data to the third device comprises executing a script that causes the first device to transmit the recorded data to the third device.

8. The method of claim 7, wherein the script comprises a PHP script.

9. The method of claim 1, wherein the data comprises packet data.

10. The method of claim 1, wherein the first device records the data after the third device receives the data from the second device.

11. A method for use with a first device, a second device, a third device, and a scheduling system, the method comprising:
    the scheduling system selecting an entry from a rundown comprising entries indicative of a sequence of events related to a news program;
    the scheduling system making a determination that the selected entry is associated with an identifier assigned to a recording of data transmitted from the first device to the second device, wherein the data was recorded by the third device after the data was transmitted from the first device to the second device; and
    responsive to the scheduling system making the determination, the scheduling system causing the third device to transmit the recorded data to the second device.

12. The method of claim 11, wherein the first device is configured for designing one or more media effects and the second device is configured for running one or more media effects.

13. The method of claim 12, wherein the data comprises instructions for causing the second device to run a media effect, and wherein causing the third device to transmit the recorded data to the second device thereby causes the second device to run the media effect.

14. The method of claim 13, wherein the data further comprises instructions for causing the second device to load the media effect.

15. The method of claim 12, wherein the data transmitted from the third device to the second device includes instructions that cause the second device to retrieve and run a media effect on a preview channel of the second device.

16. The method of claim 11, wherein causing the third device to transmit the recorded data to the second device comprises executing a script that causes the third device to transmit the recorded data to the second device.

17. The method of claim 16, wherein the script comprises a PHP script.

18. The method of claim 11, wherein the data comprises packet data.

19. A method for use with a first device, a second device, a third device, and a scheduling system, wherein the second device transmits data to the third device, the method comprising:
    after the second device transmits the data to the third device, the first device recording the data;
    using the recorded data to generate data that is a modified version of the recorded data;
    assigning an identifier to the generated data;
    the scheduling system selecting an entry from a rundown comprising entries indicative of a sequence of events related to a news program;
    the scheduling system making a determination that the selected entry is associated with the assigned identifier; and
    responsive to the scheduling system making the determination, the scheduling system causing the generated data to be transmitted, from a device other than the second device, to the third device.

20. A method for use with a first device, a second device, a third device, and a scheduling system, the method comprising:

the scheduling system selecting an entry from a rundown comprising entries indicative of a sequence of events related to a news program;

the scheduling system making a determination that the selected entry is associated with an identifier assigned to data generated based on a recording of data transmitted from the first device to the second device, wherein the data was recorded by the third device after the data was transmitted from the first device to the second device; and responsive to the scheduling system making the determination, the scheduling system causing the third device to transmit the generated data to the second device.

\* \* \* \* \*